United States Patent
Choi et al.

(10) Patent No.: US 10,904,281 B2
(45) Date of Patent: Jan. 26, 2021

(54) CLOUD-BASED SECURITY TESTING INTERFACE WITH SECURITY SCANNERS

(71) Applicant: ORACLE INTERNATIONAL CORPORATION, Redwood Shores, CA (US)

(72) Inventors: Yongki Choi, Redwood City, CA (US); Hyun Jeong Shin, Palo Alto, CA (US); Eric Cao, Redwood Shores, CA (US); Yanlei Eileen He, Redwood Shores, CA (US)

(73) Assignee: Oracle International Corporation, Redwood Shores (CA)

( * ) Notice: Subject to any disclaimer, the term of this patent is extended or adjusted under 35 U.S.C. 154(b) by 345 days.

(21) Appl. No.: 15/955,836

(22) Filed: Apr. 18, 2018

(65) Prior Publication Data
US 2019/0327258 A1    Oct. 24, 2019

(51) Int. Cl.
*H04L 29/06* (2006.01)
*H04L 12/24* (2006.01)
*H04L 12/26* (2006.01)

(52) U.S. Cl.
CPC .......... *H04L 63/1433* (2013.01); *H04L 41/22* (2013.01); *H04L 43/50* (2013.01); *H04L 63/20* (2013.01); *G06F 2221/034* (2013.01)

(58) Field of Classification Search
CPC ..... H04L 63/1433; H04L 63/20; H04L 41/22; H04L 43/50; G06F 2221/034
See application file for complete search history.

(56) References Cited

U.S. PATENT DOCUMENTS

| | | | | |
|---|---|---|---|---|
| 6,167,537 A * | 12/2000 | Silva | ................ | G01R 31/31903 714/46 |
| 8,676,723 B2 * | 3/2014 | Jung | ................... | G06F 11/3684 706/12 |
| 8,839,035 B1 * | 9/2014 | Dimitrovich | ....... | G06F 11/3688 714/25 |
| 8,990,392 B1 * | 3/2015 | Stamos | ................... | H04L 43/08 709/224 |

(Continued)

OTHER PUBLICATIONS

Jerry Gao 1,2, Xiaoying Bai2, and Wei-Tek Tsai "Cloud Testing—Issues, Challenges, Needs and Practice", Software Engineering : An International Journal (SEIJ), vol. 1, No. 1, Sep. 2011, pp. 9-23 (Year: 2011).*

*Primary Examiner* — Catherine Thiaw
(74) *Attorney, Agent, or Firm* — Kraguljac Law Group, LLC

(57) ABSTRACT

Systems, methods, and other embodiments associated with cloud-based multi-layered security testing of a target application with multiple cloud-based security scanners using a single cloud-based graphical user interface are described. In one embodiment, a method includes receiving a request via a security testing interface to perform the cloud-based multi-layered security test on the target application. A single set of security test instructions to perform the cloud-based multi-layered security test on the target application using the selected cloud-based security scanners is generated and executed to initiate multiple security tests on the target application. A single set of scan results for the target application is generated based upon the execution of the multiple security tests, and is displayed by the single cloud-based graphical user interface.

20 Claims, 13 Drawing Sheets

(56) References Cited

U.S. PATENT DOCUMENTS

| | | | | |
|---|---|---|---|---|
| 9,076,013 | B1* | 7/2015 | Bailey, Jr. | G06F 21/6227 |
| 9,218,269 | B2* | 12/2015 | Dolinina | G06F 11/3672 |
| 2009/0307763 | A1* | 12/2009 | Rawlins | G06F 11/3672 |
| | | | | 726/5 |
| 2010/0218256 | A1* | 8/2010 | Thomas | H04L 63/1433 |
| | | | | 726/25 |
| 2012/0078566 | A1* | 3/2012 | Gintis | H04L 41/0866 |
| | | | | 702/119 |
| 2012/0290527 | A1* | 11/2012 | Yalamanchilli | G06F 16/283 |
| | | | | 707/602 |
| 2013/0019242 | A1* | 1/2013 | Chen | H04L 41/145 |
| | | | | 718/1 |
| 2014/0047545 | A1* | 2/2014 | Sidagni | G06F 21/577 |
| | | | | 726/25 |
| 2014/0237292 | A1* | 8/2014 | Chan | G06F 11/2733 |
| | | | | 714/32 |
| 2016/0117287 | A1* | 4/2016 | Berry | G06F 11/368 |
| | | | | 715/736 |
| 2018/0025157 | A1* | 1/2018 | Titonis | H04W 12/1208 |
| | | | | 726/24 |
| 2019/0109777 | A1* | 4/2019 | Mircescu | H04L 67/104 |
| 2019/0238582 | A1* | 8/2019 | Sauve | H04L 41/22 |

* cited by examiner

SECURITY TEST DATA STRUCTURE — 130

| PARAMETER 1 (305) | PARAMETER 2 (310) | SECURITY SCANNER (315) | DEFINITION (320) |
|---|---|---|---|
| TYPE (1) | CONTENT (1) | SECURITY SCANNER (1) | SECURITY SCANNER DEFINITION (1) |
| TYPE (2) | CONTENT (2) | SECURITY SCANNER (2) | SECURITY SCANNER DEFINITION (2) |
| TYPE (3) | CONTENT (3) | SECURITY SCANNER (3) | SECURITY SCANNER DEFINITION (3) |
| TYPE (4) | CONTENT (4) | SECURITY SCANNER (4) | SECURITY SCANNER DEFINITION (4) |
| TYPE (5) | CONTENT (5) | SECURITY SCANNER (5) | SECURITY SCANNER DEFINITION (5) |

CLOUD-BASED SECURITY TESTING INTERFACE WITH SECURITY SCANNERS

BACKGROUND

Computing devices are used to implement various services and products. For example, a team of programmers may use a group of computing devices to develop a communication service. Components of the service, such as user interfaces and transmitted/received messages, may be stored within databases or other storage structures of a distributed network environment (e.g., a cloud service), or within databases or other storage structures of a local computer.

The service is designed to interact with many devices. Thus, if the service were to be infected by malware, the service could spread the malware across the many devices. Accordingly, to prevent such a security failure, the team of programmers may interact with each of the computing devices to test the security of the service. The testing of the security can include determining whether the service has characteristics that expose the service to infections by malware, or whether security measures have been implemented to prevent infections by malware on the service. Each computing device may be used to test a different aspect of the security using different security tools. The capabilities of each computing device serves to determine which security tools that computing device is to operate.

Testing the security of a service or product with a variety of security tools is a resource-intensive task. The testing involves much interaction by the team of programmers with multiple interfaces that are accessed from multiple computing devices. The security tools are either launched in parallel by multiple skilled operators, or sequentially by the same skilled operator. Even after testing has been completed, processing the results of the various security tools can also be resource-intensive and take weeks or months to complete. As a result, release of the service for public use may be significantly delayed. Alternatively, the service may be released prior to being completely security tested, and thus may expose users of the service to dangerous security risks.

In order to improve the performance of the computing devices, the effectiveness and secureness of the services, the speed at which the services are security tested, and satisfaction of customers of the services, it is desirable for the providers of the services to be able to efficiently test the security of the services using the various security tools available.

Unfortunately, typical existing techniques are limited to using professional security testers to separately access each security tool on a computing device with sufficient resources to fully run the security tool, separately operate each security tool, and separately process the results generated by each security tool. Thus, the security testing of services has been restricted by a time-consuming and resource-consuming process that causes significant delay and much redundancy.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 3D illustrates an embodiment of a system associated with cloud-based multi-layered security testing, where a plurality of cloud-based security scanners are stored in a security test data structure.

DETAILED DESCRIPTION

Figure 1:
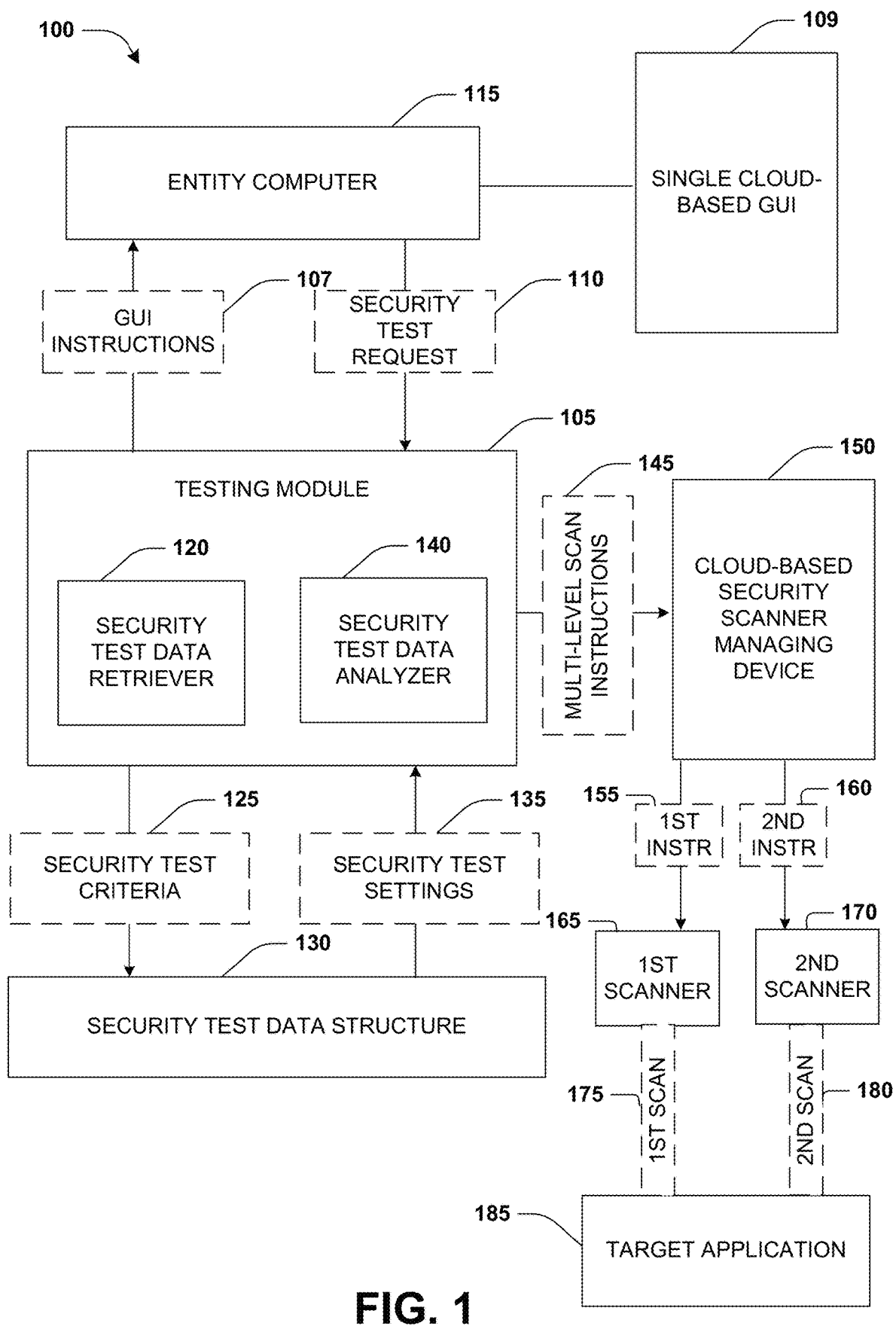
FIG. 1 illustrates an embodiment of a system associated with cloud-based multi-layered security testing.

Computerized systems and methods are described herein that provide for cloud-based multi-layered security testing of a target application. In particular, a single cloud-based graphical user interface is employed in a centralized manner to security test the target application. Thorough security testing of the target application can require the use of multiple cloud-based security scanners of different types. Each cloud-based security scanner might scan the target application in a different manner. The various cloud-based security scanners may identify different or overlapping issues in the target application.

The cloud-based multi-layered security testing improves existing technological processes for security testing applications by providing the single cloud-based graphical user interface to perform a cloud-based multi-layered security test on the target application with the multiple cloud-based security scanners. The single cloud-based graphical user interface provides for a single interface through which multiple cloud-based security scanners can be initiated.

Thus, this cloud-based multi-layered security testing system improves existing technological processes for security testing applications by eliminating the need to separately provide manual inputs across multiple interfaces for each security test. By doing so, the system solves technical problems relating to errors and time delays caused by the manual inputs across multiple interfaces for multiple security tests.

The cloud-based multi-layered security test is cloud-based by virtue of being stored and operated at least partially in a cloud-based network, across one or more networked computing devices. Similarly, the single cloud-based graphical user interface is centralized by virtue of providing a single point of access that can be accessed from various remote devices to configure the multiple cloud-based security scanners.

Thus, the system eliminates the need to run each security test from a computer with resources capable of fully performing the security test. This also eliminates the need of the person requesting the test to have knowledge of the computer's resources prior to sending a test request and ensuring that the computer has appropriate resources to perform the test. Instead, the system allows the security tests to be run from almost any computer with minimal technical resources, such as resources sufficient to simply access and render the single cloud-based graphical user interface and transmit a test request via a network. The test request can then be used to initiate the security tests using cloud-based computing resources, without relying upon the computer that transmitted the request. Accordingly, due to the cloud-based nature of the system, security tests will not fail to properly perform as a result of technical shortcomings of the computers used to launch the security tests.

The cloud-based multi-layered security test is multi-layered by virtue of the initiation of multiple cloud-based security scanners, rather than a single cloud-based security scanner. The cloud-based multi-layered security test can be run on the target application in response to a single request. A single set of scan results can be compiled for the target application based upon the multiple cloud-based security scanners. Thus, the system mitigates inefficiency and redundancy in processing multiple scan results from multiple cloud-based security scanners, as well as mitigating delays and expenses caused by requiring security experts to perform each security testing. Accordingly, while security testing a target application could otherwise take months to complete, the system enables the security testing to be completed in a matter of hours or several days depending on the complexity of the testing.

In one embodiment, the multiple cloud-based security scanners may include scanners for testing a user interface of the target application, scanners for testing Representational State Transfer (REST)ful web services of the target application, or scanners for server side testing for the target application. In one embodiment, the multiple cloud-based security scanners may include scanners configured to detect or prevent malicious browser helper objects (BHOs), browser hijackers, ransomware, key loggers, backdoors, rootkits, Trojan horses, worms, malicious layered service providers (LSPs), dialers, fraud tools, adware, spyware, malicious URLs, spam, phishing attacks, online banking attacks, social engineering techniques, advanced persistent threats (APT) or denial of service (DoS) attacks.

With reference to FIG. 1, one embodiment of a computerized system 100 associated with cloud-based multi-layered security testing of a target application 185 is illustrated. For example, the target application 185 may be a web application that, after being verified to be secure, is to be provided for commercial purposes to various clients/companies.

A testing module 105 generates graphical user interface instructions 107. The testing module 105 transmits the graphical user interface instructions 107 to an entity computer 115, such as a computer of a development manager of the target application 185. The entity computer 115 executes the graphical user interface instructions 107 to display a single cloud-based graphical user interface 109 displaying a security testing interface. The single cloud-based graphical user interface 109 is used by the entity computer 115 to generate a security test request 110 requesting that the target application 185 be security tested by multiple security tests. The entity computer 115 transmits the security test request 110 to the testing module 105 over a network connection.

The testing module 105 utilizes a security test data retriever 120 to generate security test criteria 125 (of the security test request 110) that are used to determine the type of security tests with which to test the target application 185. In one embodiment, the security test criteria 125 reflects selectable inputs that were selected by a user (the development manager) of the single cloud-based graphical user interface 109 to generate the security test request 110. The security test criteria 125 may specify one or more security tests to be run, or one or more aspects of security of the target application 185 that are to be monitored in accordance with the security test request 110.

The security test criteria 125 are used to analyze a security test data structure 130 in order to identify data records to be considered for the security test request 110. The security test data structure 130 includes data records of various cloud-based security scanners that are available to be implemented for running security tests. The security test data structure 130 also includes data records of the various parameters associated with each cloud-based security scanner.

The testing module 105 uses the security test data structure 130 to generate security test settings 135 representative of the cloud-based security scanners that match the security test criteria 125. In some examples, the security test settings 135 may include representations of cloud-based security scanners that meet at least one of the security test criteria 125. In other examples, the security test settings 135 may include representations of cloud-based security scanners that meet two or more, or all, of the security test criteria 125.

The testing module 105 utilizes a security test data analyzer 140 to analyze the security test settings 135 to determine which of the identified cloud-based security scanners to select for implementing as part of the security test.

The testing module 105 generates multi-level scan instructions 145 for transmission to a managing device 150 configured to manage the available cloud-based security scanners. The multi-level scan instructions 145 include a single set of security test instructions to cause the managing device 150 to perform the cloud-based multi-layered security test on the target application 185. Execution of the multi-level scan instructions 145 initiates multiple security tests on the target application 185 using the selected cloud-based security scanners.

In accordance with the multi-level scan instructions 145, the managing device 150 transmits instructions to cloud-based security scanners selected for the cloud-based multi-level security test. A first scan instruction 155 is sent to a first cloud-based security scanner 165, and a second scan instruction 160 is sent to a second cloud-based security scanner 170. The cloud-based security scanners may be operated by a common computing device, or different computing devices. Each instructed cloud-based security scanner then scans the target application 185. The first cloud-based security scanner performs a first cloud-based security scan 175 of the target application 185, and the second cloud-based security scanner performs a second cloud-based security scan 180 of the target application 185. A single set of scan results is compiled for the target application 185 based upon the multiple security tests, and is displayed in the single cloud-based graphical user interface 109.

Thus, the single cloud-based graphical user interface 109 is used to efficiently and flexibly perform multiple security tests associated with multiple cloud-based security scanners on the target application 185. The multiple security tests are performed in response to a single request generated using the single cloud-based graphical user interface 109, which decreases the time and resources that would otherwise need to be used to separately configure and launch each security test individually. The single cloud-based graphical user interface 109 is accessible from any computing device than can establish a network connection with the testing module 105, which increases the ease with which the multiple security tests can be launched.

The single set of scan results also provides an improved interface that assembles the scan results of the multiple security tests and modifies the assembled scan results. In one embodiment, the improved interface modifies the results by identifying and removing redundancies and conflicts between the scan results of different security tests. The improved interface also serves to decrease the time and resources that would be needed to separately and independently access, review, and interact with scan results of different security tests using existing techniques.

Figure 2:
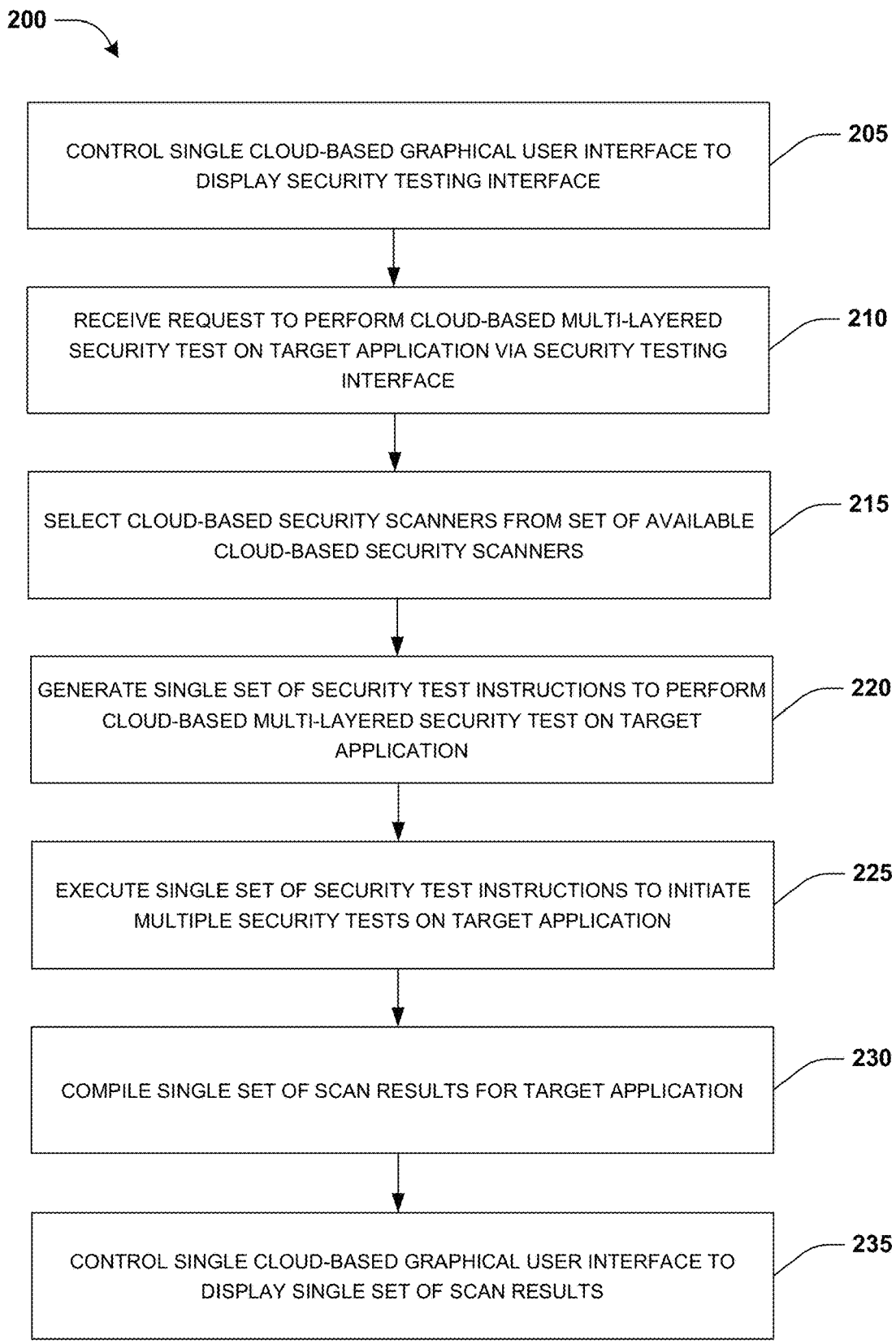
FIG. 2 illustrates an embodiment of a method associated with cloud-based multi-layered security testing.

With reference to FIG. 2, one embodiment of a computer implemented method 200 associated with cloud-based multi-layered security testing is illustrated. In one embodiment, the method 200 is performed by the testing module 105 utilizing various computing resources of the computer 515. The computing resources, such as the processor 520, are used for executing instructions associated with cloud-based multi-layered security testing. Memory 535 and/or disks 555 are used for storing data structures of commands for performing cloud-based multi-layered security testing. Network hardware is used for communication of security test commands, scanning commands, and/or graphical user interface data between the computer 515 and remote computers over a network, such as for providing a security testing interface to devices. The method 200 is triggered upon determining that a security test command is to be executed.

In one embodiment, the testing module 105 generates graphical user interface instructions 107 that cause the computer to generate the single cloud-based graphical user interface 109. A network connection is established between the testing module 105 and the entity computer 115. The graphical user interface instructions 107 for the single cloud-based graphical user interface 109 are transmitted to the entity computer 115 over the network connection.

In some examples, the graphical user interface instructions 107 are provided in response to receiving a request from the entity computer 115 for a security testing interface. The request may have been generated by a web browser operating on the entity computer 115. In one embodiment, the request may have been generated as a part of a web application.

Figure 3A:
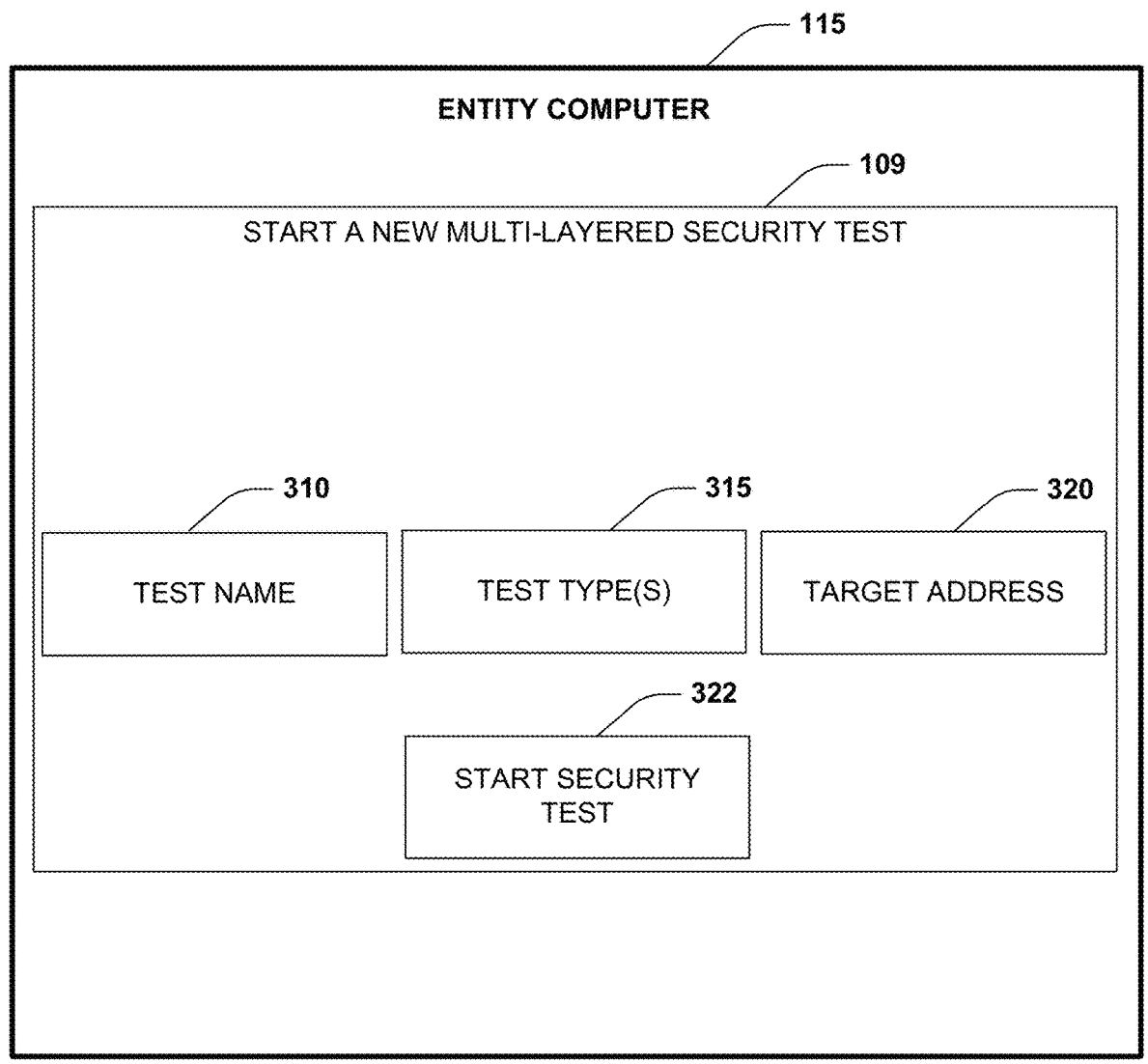
FIG. 3A illustrates an embodiment of a system associated with cloud-based multi-layered security testing, where a single cloud-based graphical user interface is displayed.

Upon receiving the graphical user interface instructions 107, the entity computer 115 uses the graphical user interface instructions 107 to generate and display the single cloud-based graphical user interface 109 on a screen, as illustrated in FIG. 3A. In some examples, the single cloud-based graphical user interface 109 is rendered within the web browser.

At 205, the single cloud-based graphical user interface 109 displays a security testing interface. The security testing interface includes a plurality of selectable inputs. The selectable inputs of the security testing interface can be used (by a user of the entity computer 115) to define a cloud-based multi-layered security test. The cloud-based multi-layered security test can be performed on a target application 185 to assess a level of security of the target application 185.

In one embodiment, the single cloud-based graphical user interface 109 includes a first selectable input 310, a second selectable input 315, and a third selectable input 320, as illustrated in FIG. 3A. The first selectable input 310 is configurable to define a test name of the cloud-based multi-layered security test. The second selectable input 315 is configurable to define one or more types of tests 315 with which the target application 185 is to be evaluated. The third selectable input 320 is configurable to define a target address of the target application 185 that is to be security tested. The target address may be a URL, an IP address, or another type of address. Each selectable input can be a menu comprising a plurality of options, a text input box, or another type of input.

The test name defined via the first selectable input 310 can be linked and stored with the submission of information via the security testing interface. The test name can also be linked and stored with any results that are ultimately generated in response to a request for security testing generated by the security testing interface. The test name can later be retrieved and presented (for display) in association with those results. For example, the test name can be displayed in a list of a multiple test names, where each name in the list is associated with a different security test. Selection of the test name may cause a display of information about the results associated with the test name.

The types of tests defined via the second selectable input 315 can later be used to pick cloud-based security scanners. The target address defined via the third selectable input 320 can be used to determine a location of a target application 185. In one embodiment, a network connection is established to the target application 185 using the location, and the target application 185 is security tested using the network connection. The values defined for each selectable input can be transmitted to the testing module 105 in response to selection of a security test activation button 322 configured to start the security test.

Accordingly, using the single cloud-based graphical user interface 109, a user can launch the cloud-based multi-layered security test that can scan the target application 185 with multiple security tests. Notably, the user would thus not need to separately interact with different interfaces for each security test desired.

The user would be able to launch the cloud-based multi-layered security test from any computing device with the (minimal) ability of rendering the single cloud-based graphical user interface 109. Notably, the computing device from which the cloud-based multi-layered security test is launched would not be relied upon to run the scans. Accordingly, the user would not be limited to accessing the interface of each security test from a computing device capable of performing the scans required by the security test.

Instead, in one embodiment, the scans would be run by cloud-based computing devices independent of the operations of the computing device from which the cloud-based multi-layered security test is launched. For example, after launching the cloud-based multi-layered security test, the computing device could be shut down (or reassigned to other tasks) without interrupting the running of the scans.

The single cloud-based graphical user interface 109 would be accessible from various remote devices in a centralized manner, as the single cloud-based graphical user interface 109 would serve as a connection to a single location which the various remote devices could access to launch cloud-based multi-layered security tests. The centralized nature of the single cloud-based graphical user interface 109 eliminates the need to access multiple interfaces at multiple locations in order to launch cloud-based multi-layered security tests.

Figure 3B:
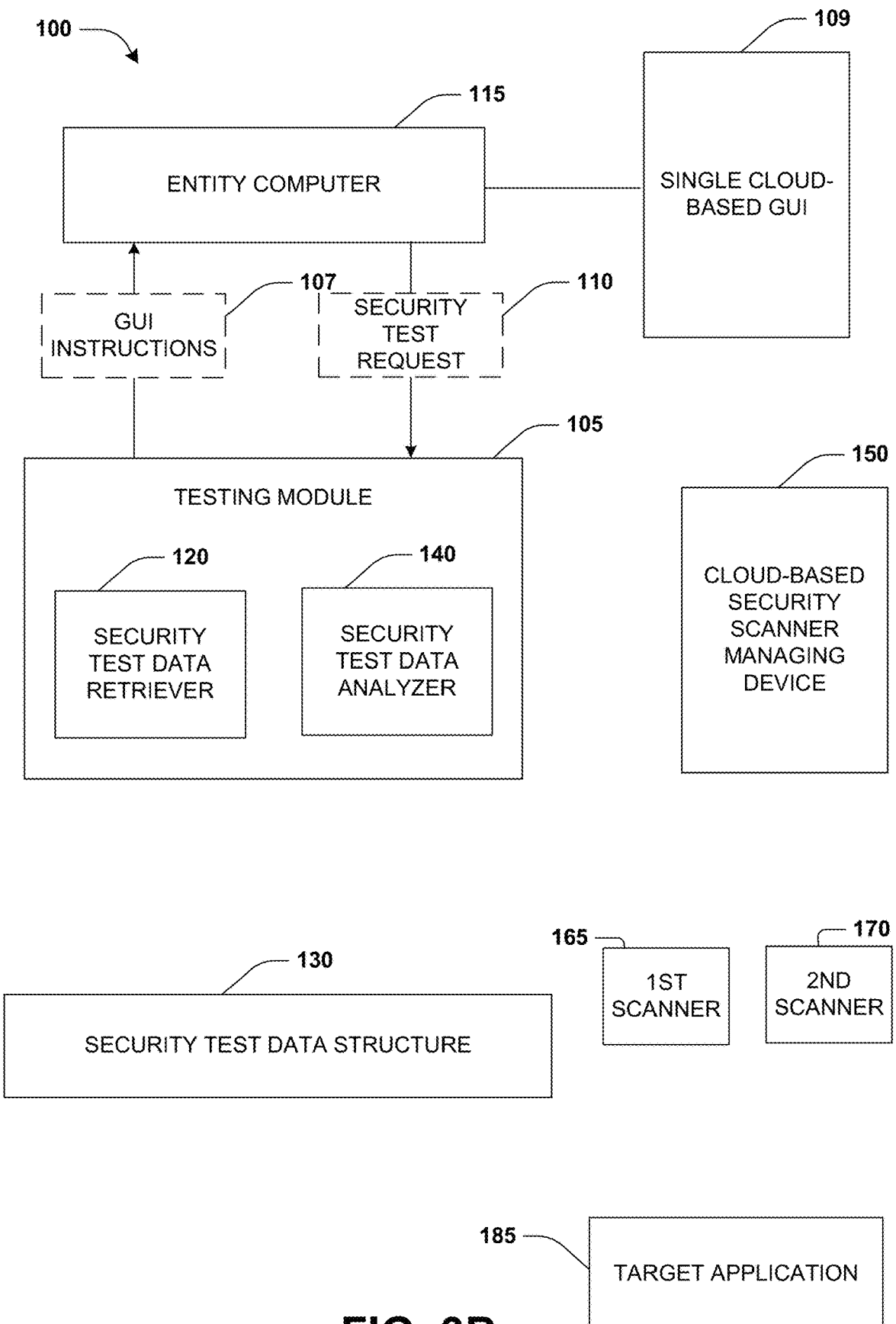
FIG. 3B illustrates an embodiment of a system associated with cloud-based multi-layered security testing, where a request to perform a cloud-based multi-layered security test is received.

Selection of the security test activation button 322 causes the entity computer 115 to generate the security test request 110. The security test request 110 is transmitted via the network connection to the testing module 105, as illustrated in FIG. 3B.

At 210, the testing module 105 receives the security test request 110. The testing module 105 parses the security test request 110 to identify criteria for creation of a custom multi-layered security test. The criteria includes identifiers of types of tests specified in the security test request 110. The criteria can also include other information that may be used to predict or filter tests.

In one embodiment, the target address is used to identify security tests associated with scanners that cannot connect to, or maintain a connection to, the target address. The identified security tests are then removed from consideration for the purposes of the custom multi-layered security test associated with the security test request 110.

Figure 3C:
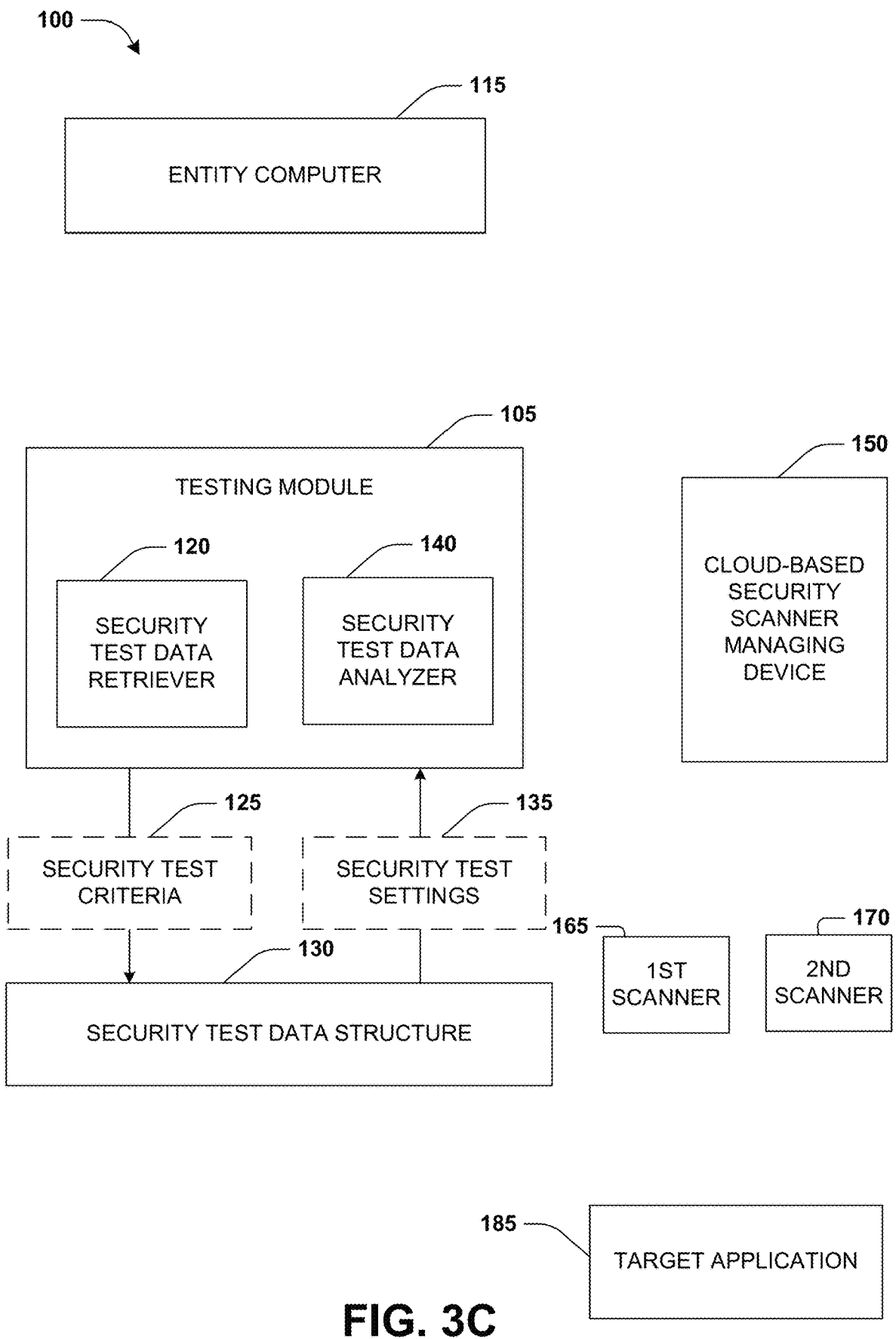
FIG. 3C illustrates an embodiment of a system associated with cloud-based multi-layered security testing, where a set of cloud-based security scanners are selected.

The security test data retriever 120 uses the criteria to generate the security test criteria 125. The security test criteria 125 is used to analyze the security test data structure 130, as illustrated in FIG. 3C. In one embodiment, entries in the security test criteria 125 are compared to entries in the security test data structure 130. Matches between the entries in the security test criteria 125 and the entries in the security test data structure 130 are used to identify potential settings for the custom multi-layered security test being designed.

The potential settings include potential cloud-based security scanners that can be considered for implementation in the custom multi-layered security test. The potential settings are retrieved from the security test data structure 130 and compiled into the security test settings 135.

FIG. 3D illustrates an example of entries stored in the security test data structure 130. The entries may be arranged based upon relationships between parameters such as a first parameter 305, a second parameter 310, a third parameter 315, and a fourth parameter 320. The first parameter 305 may be a type of security test. The second parameter 310 may be a characteristic of target content. The third parameter 315 may be a corresponding cloud-based security scanner. The fourth parameter 320 may be a definition of the cloud-based security scanner.

In one embodiment, each entry in the security test criteria 125 that identifies a type of security test is compared to the entries of the first parameter 305. In one embodiment, each entry in the security test criteria 125 that identifies a characteristic of target content is compared to the entries of the second parameter 310. As mentioned, the security scanners associated with matching entries are retrieved from the security test data structure 130. The retrieved security scanners are compiled into the security test settings 135.

Returning to FIG. 3C, the testing module 105 uses the security test data analyzer 140 to analyze the security test settings 135. The analysis of the security test settings 135 includes parsing the security test settings 135 to identify candidate cloud-based security scanners that were previously identified in accordance with the security test criteria 125.

In one embodiment, the analysis of the security test settings 135 includes filtering the candidate cloud-based security scanners based upon rules defined for the testing module 105. In some examples, the rules provide that the candidate cloud-based security scanners be compared to one another, and one or more of the candidate cloud-based security scanners be removed from consideration due to a determination of a likelihood of redundancy or conflict between two of the cloud-based security scanners. In some examples, the rules provide that one or more of the candidate cloud-based security scanners are removed from consideration due to a determination that resources required for the one or more identified cloud-based security scanners are not available.

At 215, a final set of cloud-based security scanners are selected from amongst the available cloud-based security scanners.

Figure 3E:
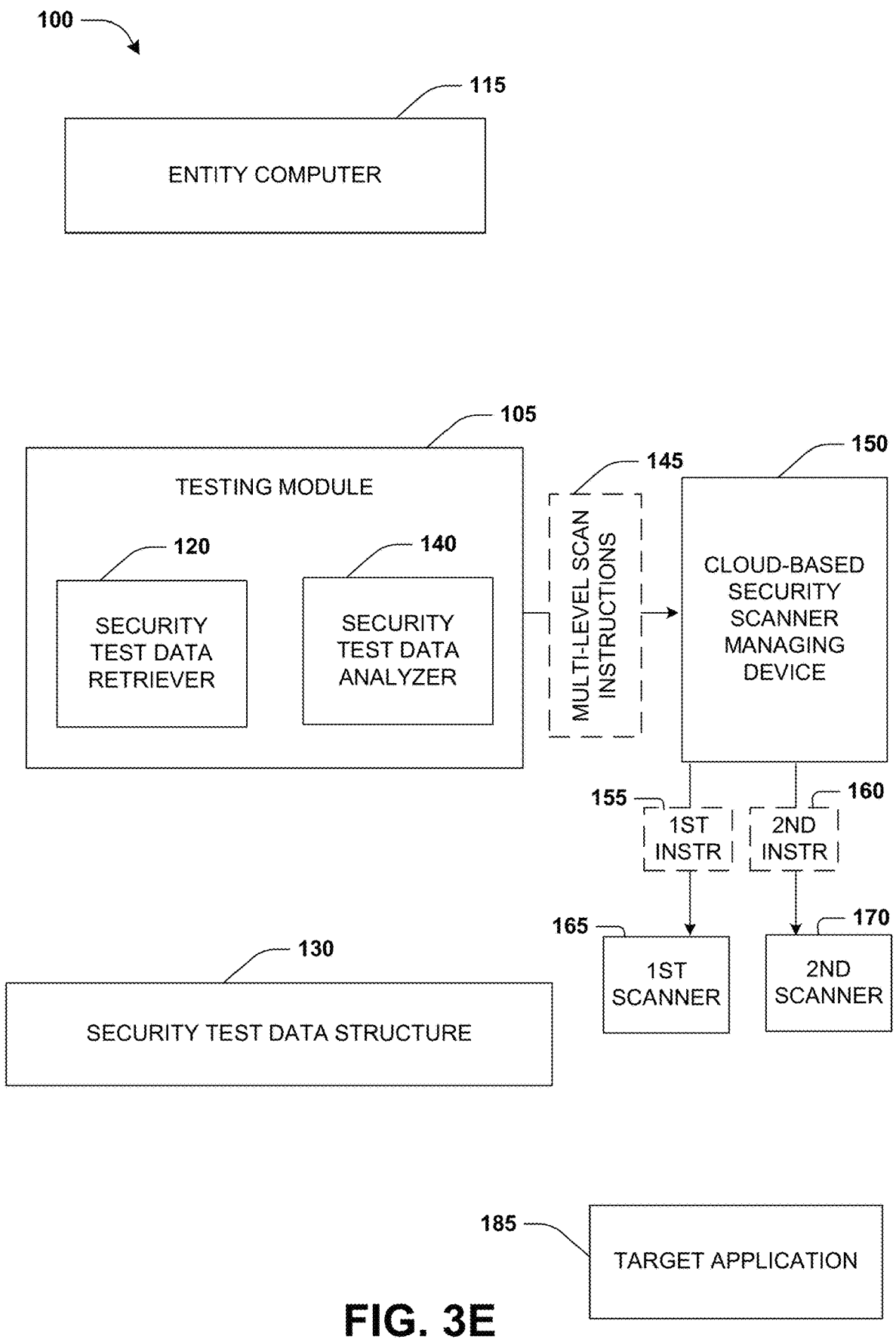
FIG. 3E illustrates an embodiment of a system associated with cloud-based multi-layered security testing, where a single set of test instructions are generated.

After the analysis of the security test settings 135 and the selection of the cloud-based security scanners, at 220, the testing module 105 generates the multi-level scan instructions 145, as illustrated in FIG. 3E. The multi-level scan instructions 145 are a single set of test instructions that identify the target application 185 to be security tested. The multi-level scan instructions 145 also identify one or more cloud-based security scanners that are to be used to security test the target application 185.

The target application 185 can be identified in the multi-level scan instructions 145 using the target address extracted from the security test request. Alternatively, the target application can be identified in the multi-level scan instructions 145 using a custom target address (different than the target address). In one embodiment, the custom target address identifies a network path determined (by the testing module 105) to connect the testing module 105 to the target application 185.

In one embodiment, the multi-level scan instructions 145 links the identifier of each cloud-based security scanner with a value defining a desired scope of activities of the cloud-based security scanner. The scope of activities may be limited to constraining the cloud-base security scanner for the custom multi-layered security test being designed. For example, the scope of activities may specify an aspect or portion of the cloud-based security scanner to be implemented when scanning the target application 185. Alternatively and/or additionally, the scope of activities may specify a second aspect or second portion of the cloud-based security scanner to be excluded when scanning the target application 185.

In some examples, the testing module 105 extracts login credentials for the target application 185 from the security test request 110, and includes the login credentials in the multi-level scan instructions 145. The login credentials can include a username and password combination, a password, a fingerprint, a facial scan, a retinal scan, or a different type of login credential.

At 225, the multi-level scan instructions 145 are executed to initiate multiple security tests on the target application 185. In one embodiment, the testing module 105 establishes a network connection with the managing device 150. The testing module 105 then transmits the multi-level scan instructions 145 to the managing device 150 over the network connection.

The managing device 150 parses the multi-level scan instructions 145 to (separately) identify the target application 185, each cloud-based security scanner, and (if applicable) the desired scope for each cloud-based security scanner. The managing device 150 then generates customized instructions for each of the identified cloud-based security scanners. For example, the managing device 150 generates the first scan instruction 155 and the second scan instruction 160 for the first cloud-based security scanner 165 and the second cloud-based security scanner 170, respectively.

The customized instructions for each cloud-based security scanner include instructions to establish a network connection with the target application 185, instructions to run the cloud-based security scanner, and (if applicable) instructions to limit the cloud-based security scanner to testing the target application 185 within the bounds of the defined scope.

The managing device 150 then provides each of the customized instructions to the corresponding cloud-based security scanner. For example, the managing device 150 provides the first scan instruction 155 and the second scan instruction 160 to the first cloud-based security scanner 165 and the second cloud-based security scanner 170, respectively. In some examples, the managing device 150 may host one or more of the cloud-based security scanners, but in other examples, one or more of the cloud-based security scanners may be located on remote computing devices.

Accordingly, the managing device 150 may establish a network connection to each of the remote computing devices, and transmit each of the customized instructions over the corresponding network connection to the corresponding remote computing device. In some examples, two (or more) of the cloud-based security scanners may be located on a same remote computing device. In other examples, two (or more) of the cloud-based security scanners may be located on different remote computing devices.

Each of the cloud-based security scanners, such as the first cloud-based security scanner 165 and the second cloud-based security scanner 170, parses the received customized instructions to identify an identifier of the target application 185. In some examples, each of the cloud-based security scanners parses the received customized instructions to identify login credentials for accessing the target application 185, or instructions to limit the cloud-based security scanner to testing the target application 185 within the bounds of the defined scope.

Figure 3F:
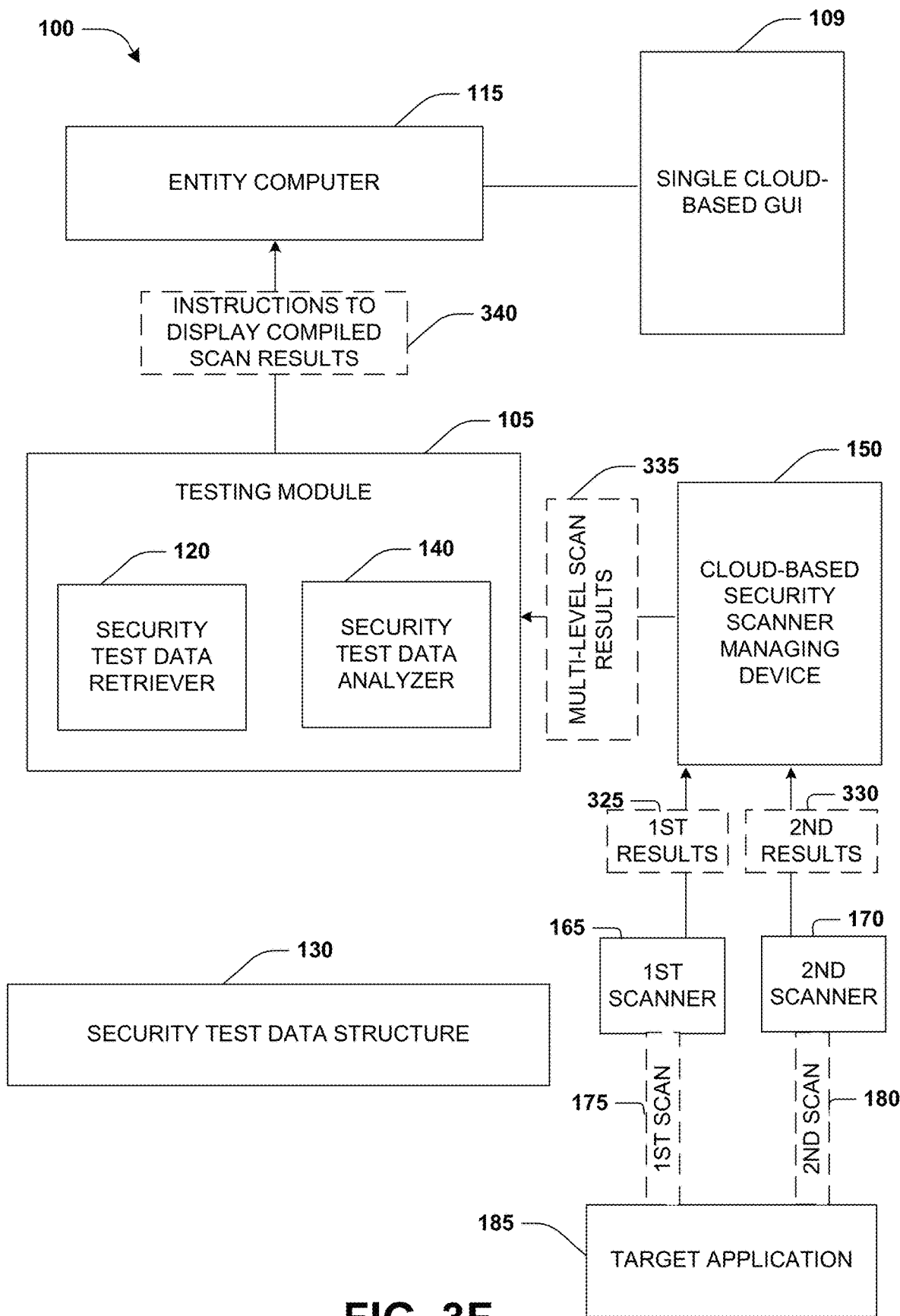
FIG. 3F illustrates an embodiment of a system associated with cloud-based multi-layered security testing, where a single set of scan results are compiled.

As illustrated in FIG. 3F, each of the cloud-based security scanners then establishes a network connection to the target application 185 (using login credentials if applicable), and performs security scanning activities on the target application 185. For example, the first cloud-based security scanner 165 and the second cloud-based security scanner 170 perform the first cloud-based security scan 175 and the second cloud-based security scan 180, respectively.

In some examples, if the target application 185 requires login credentials but no login credentials or incorrect login credentials were provided via the security test request 110, the cloud-based security scanners may not be granted access to perform security scanning activities on the target application 185. In some examples, the cloud-based security scanners may merely be granted access to perform security scanning activities on a limited portion of the target application 185, such as a login page of the target application 185.

In one embodiment, one or more of the cloud-based security scanners are linked with a list of security scripts. The scanning performed by each cloud-based security scanner includes accessing the corresponding list and scanning the target application 185 using each security script in the corresponding list.

If applicable, each cloud-based security scanner limits the corresponding security scanning activities in accordance with the defined scope. In some examples, the cloud-based security scanners may scan the target application 185 concurrently. In other examples, the cloud-based security scanners may coordinate with one another and scan the target application 185 sequentially. For example, available resources are evaluated based upon the security test request 110. Based upon the evaluation, a determination is made to perform the scans sequentially in order to prevent exceeding using a threshold amount of resources, such as bandwidth, memory, or processing power, associated with the target application 185.

Each of the cloud-based security scanners generates scan results based upon the corresponding security scanning of the target application 185. For example, the first cloud-based security scanner 165 and the second cloud-based security scanner 170 generate first security scanner results 325 and second security scanner results 330, respectively.

The scan results are transmitted from each cloud-based security scanner to the managing device 150 (over the network connection, where applicable). The managing device 150 combines the various scan results to generate multi-level scan results 335. The managing device 150 then transmits the multi-level scan results 335 to the testing module 105 (over the network connection).

The testing module 105 parses the multi-level scan results 335 to identify each security-related issue found during each scan. The security-related issues may include known malware, vulnerabilities, suspicious content, etc.

The testing module 105 then analyzes the security-related issues to identify correctable data. Correctable data can include false positives, redundancies, and conflicts. The testing module 105 evaluates each instance of correctable data, and determines whether one or more known corrective actions are likely to resolve the correctable data. In some examples, a corrective action is taken to modify the correctable data, while in other examples, the correctable data is flagged for additional review.

In one embodiment, each issue in the multi-level scan results 335 is used to query a false positive data structure. The false positive data structure includes a list of historical issues that were either automatically or manually identified as being false positives. Where the issue matches an entry in the false positive data structure, the issue is marked as a potential false positive.

In one embodiment, issues in the multi-level scan results 335 that were identified by different cloud-based security scanners are compared to one another. Where two issues are determined to match or overlap one another, at least one of the two issues is marked as being a duplicate issue, or is removed.

In one embodiment, issues in the multi-level scan results 335 that were identified by different cloud-based security scanners are compared to one another. Where two issues are determined to conflict with one another, at least one of the two issues is marked as being a conflicting issue, or is removed.

At 230, a single set of scan results for the target application 185 are compiled. The single set of scan results can include all of the multi-level scan results 335, or can include a modified version of the multi-level scan results 335, revised in accordance with the identified correctable data. The testing module 105 uses the compiled single set of scan results to generate controlling scan result instructions 340. The testing module 105 establishes a network connection to the entity computer 115, and transmits the controlling scan result instructions 340 to the entity computer 115.

Figure 3G:
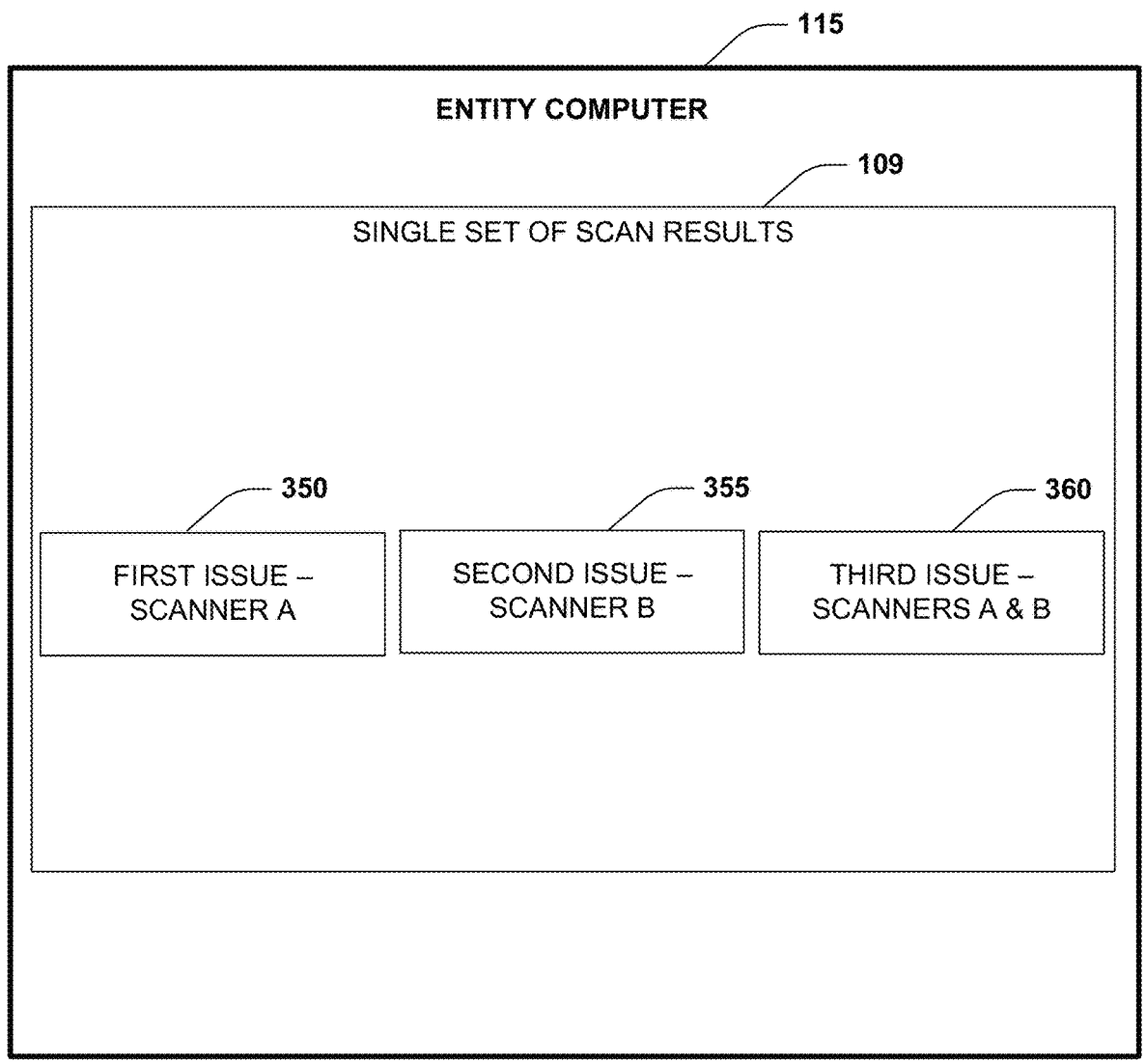
FIG. 3G illustrates an embodiment of a system associated with cloud-based multi-layered security testing, where the single cloud-based graphical user interface is controlled to display the single set of scan results.

The controlling scan result instructions 340 are executed by the entity computer 115. Thus, at 235, the single cloud-based graphical user interface 109 is controlled to display the single set of scan results, as illustrated in FIG. 3G.

The single cloud-based graphical user interface 109 can display information resulting from the scan of each cloud-based security scanner used to scan the target application 185. For example, the single cloud-based graphical user interface 109 can display a first graphical representation 350 of a first security issue identified by a first cloud-based security scanner, a second graphical representation 355 of a second security issue identified by a second cloud-based security scanner, and a third graphical representation 360 of a third security issue identified by both the first cloud-based security scanner and the second cloud-based security scanner.

In some examples, the single cloud-based graphical user interface 109 displays previously marked security issues in a different manner than other security issues that have not been marked. For example, security issues marked as potentially being false positives can be highlighted, or can be hidden from view. In another example, security issues marked as being duplicates/redundant can be highlighted, or can be hidden so that the single cloud-based graphical user interface 109 does not display the same security issue twice.

In one embodiment, the testing module 105 extracts values identifying a set of recipients from the security test request 110. For example, the set of recipients may have been defined by the entity computer 115 using the single cloud-based graphical user interface 109.

Each recipient may be identified with one or more identifiers, such as a name and an address. Addresses may be email addresses, IP addresses, instant messaging names, phone numbers, etc. In some examples, the set of recipients may all have a same type of address, while in other examples, different recipients may have different types of addresses.

The testing module 105 transmits a notification associated with the single set of scan results to the set of recipients. In one embodiment, the notification is transmitted upon compiling the single set of scan results. In another embodiment, the notification is transmitted in response to receiving a request to transmit the electronic communication from the entity computer 115.

A version of the notification may be generated for each recipient in the set of recipients, depending upon the type of address linked to the recipient. For example, a version of the notification for recipients associated with email addresses may have different formatting than a version of the notification for recipients associated with a phone number.

The corresponding version of each notification is transmitted via a network connection to the corresponding recipient. In one embodiment, the notification includes the single set of scan results. In another embodiment, the notification does not include the entire single set of scan results, and instead includes a link or text identifying the single set of scan results.

The cloud-based security scanners disclosed herein may include scanners developed to detect vulnerabilities on web-based user interfaces, or scanners developed to find penetration-related vulnerabilities in web applications. The cloud-based security scanners disclosed herein may include other third party security testing platforms.

In one embodiment, cloud-based security scanners for testing a user interface may be operated as part of a web service. The web service may provide users with a REST (Representational state transfer)ful web API configurable to start a security scan from a command line. The security scan may be started from the command line using a curl command or a scan Java client, for example.

In one embodiment, developers can integrate the RESTful web API via command line in a Continuous Integration (CI) or Continuous Delivery/Deployment (CD) pipeline. For example, the RESTful web API may be integrated using Jenkins, TeamCity, etc. This integration of the RESTful web API helps the developers find and fix security vulnerabilities at the earlier stage of Software Development Life Cycle (SDLC). For example, using the RESTful web API, developers can deploy and ship frequently, such as weekly, daily, and even multiple times a day. In one embodiment, a Quality Assurance (QA) organization can integrate the RESTful web API in a QA functional process.

In one embodiment, cloud-based security scanners for testing a user interface may be programmed to run a list of security scripts. The security scripts may include SSLHeartbleed, SSLPoodle, SSLCCSInjection, SSLTLSIntrospection, SSLCompressionCompliance, SSLSecureRenegotiationCompliance, SSLCipherSuitesCompliance, SSLProtocolsCompliance, SSLSelfSignedCompliance, SSLClientRenegotiationCompliance, SSLPublicKeysizeCompliance or SSLSignatureAlgortithmCompliance.

In one embodiment, cloud-based security scanners for server side testing may be programmed to run a list of security scripts including scripts identifying a plain text password in a config file, a plain text password in a log file, a plain text password in a script file, a plain text password in an SQL file, or a file permission issue. In one embodiment, cloud-based security scanners for server side testing may be programmed to run a list of security scripts including scripts identifying cross-site scripting, SQL injection, command injection, path traversal or insecure server configuration.

Figure 4:
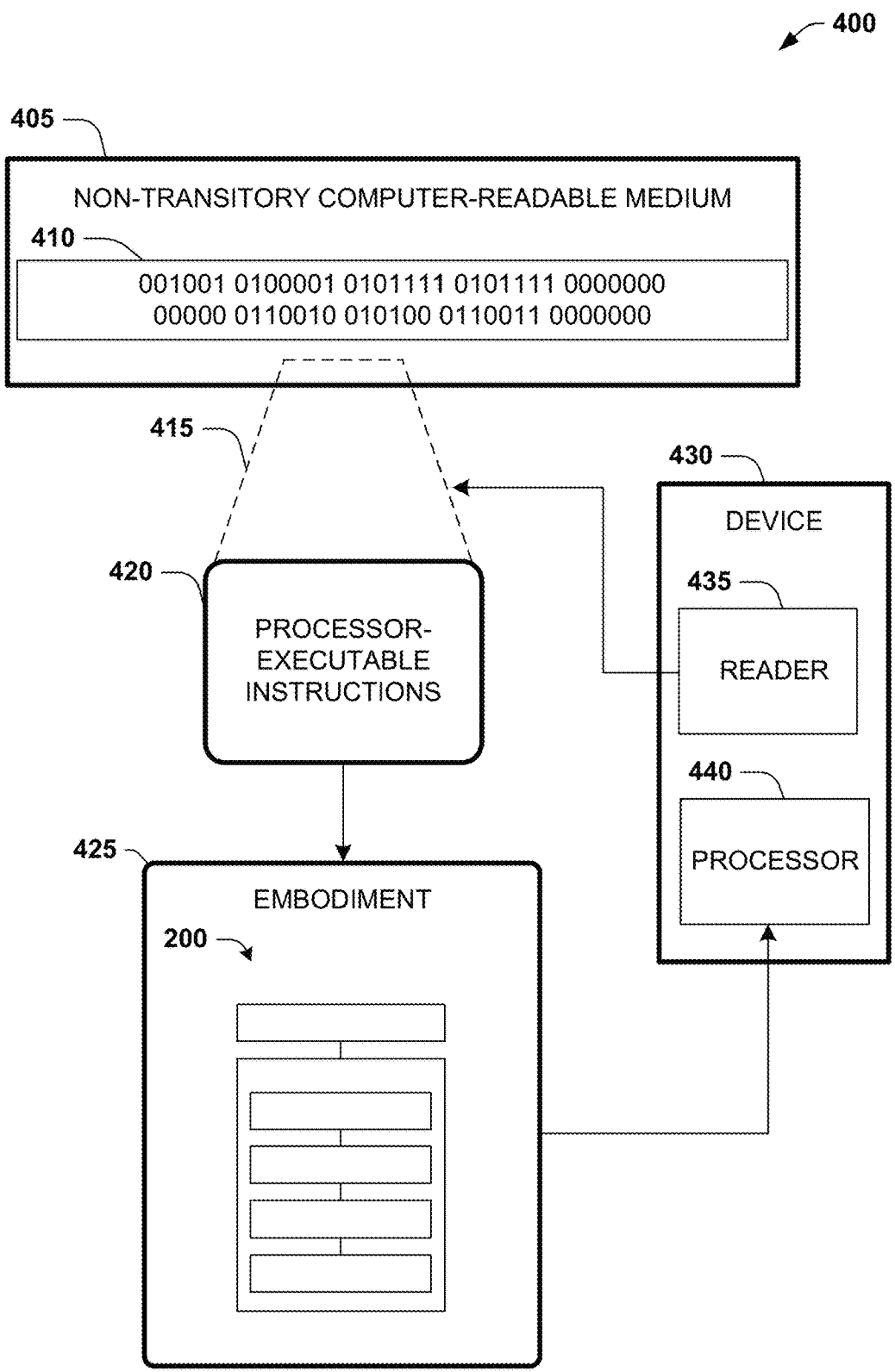
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules, such as the testing module 105, stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the, functionality of the testing module 105, stored in the non-transitory computer-readable medium 405, may be executed by the processor 440 as the processor-executable instructions 420 to perform an embodiment 425 of the method 200 of FIG. 2.

The non-transitory computer-readable medium 405 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIG. 1, for example.

Figure 5:
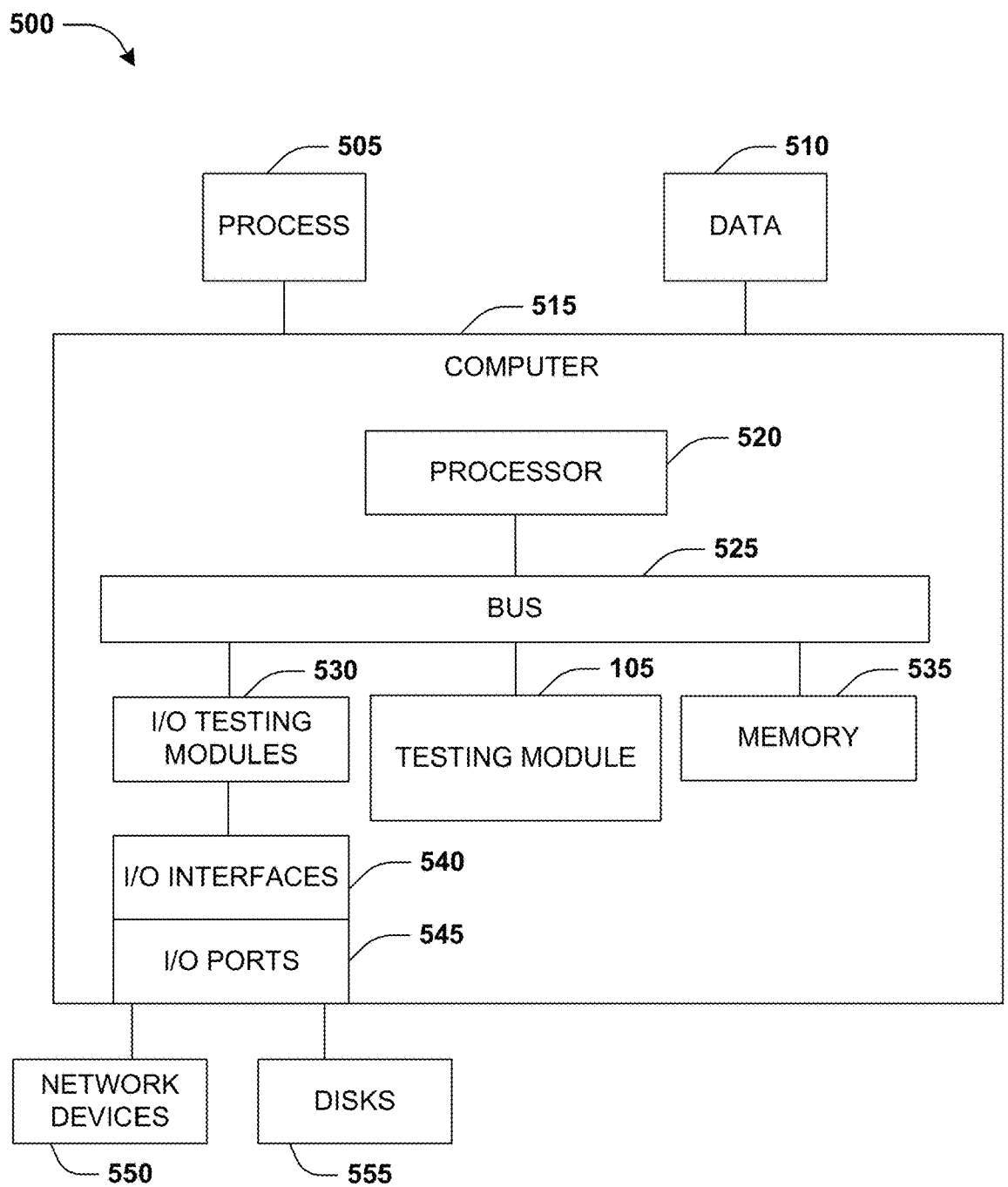
FIG. 5 illustrates an embodiment of a computing system configured with the example systems and/or methods disclosed.

FIG. 5 illustrates an example computing device 500 that is configured and/or programmed with one or more of the example systems and methods described herein, and/or equivalents. The example computing device 500 may be the computer 515 that includes a processor 520, a memory 535, and input/output (I/O) ports 545 operably connected by a bus 525. In one embodiment, the, the computer 515 may include logic of the testing module 105 configured to facilitate the system 100 and/or the method 200 shown in FIGS. 1-2. In different embodiments, the logic of the testing module 105 may be implemented in hardware, a non-transitory computer-readable medium 505 with stored instructions, firmware, and/or combinations thereof. While the logic of the testing module 105 is illustrated as a hardware component attached to the bus 525, it is to be appreciated that in other embodiments, the logic of the testing module 105 could be implemented in the processor 520, stored in memory 535, or stored in disk 555.

In one embodiment, logic of the testing module 105 or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic of the testing module 105 may also provide means (e.g., hardware, non-transitory computer-readable medium 505 that stores executable instructions, firmware) for performing rule based source sequencing for allocation.

Generally describing an example configuration of the computer 515, the processor 520 may be a variety of various processors including dual microprocessor and other multi-processor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with I/O devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote computers (e.g., the computer 515 may reside within a distributed computing environment to which clients may connect). Networks with which the computer 515 may interact include, but are not limited to, a local area network (LAN), a new area network (WAN), and other networks.

Figure 6:
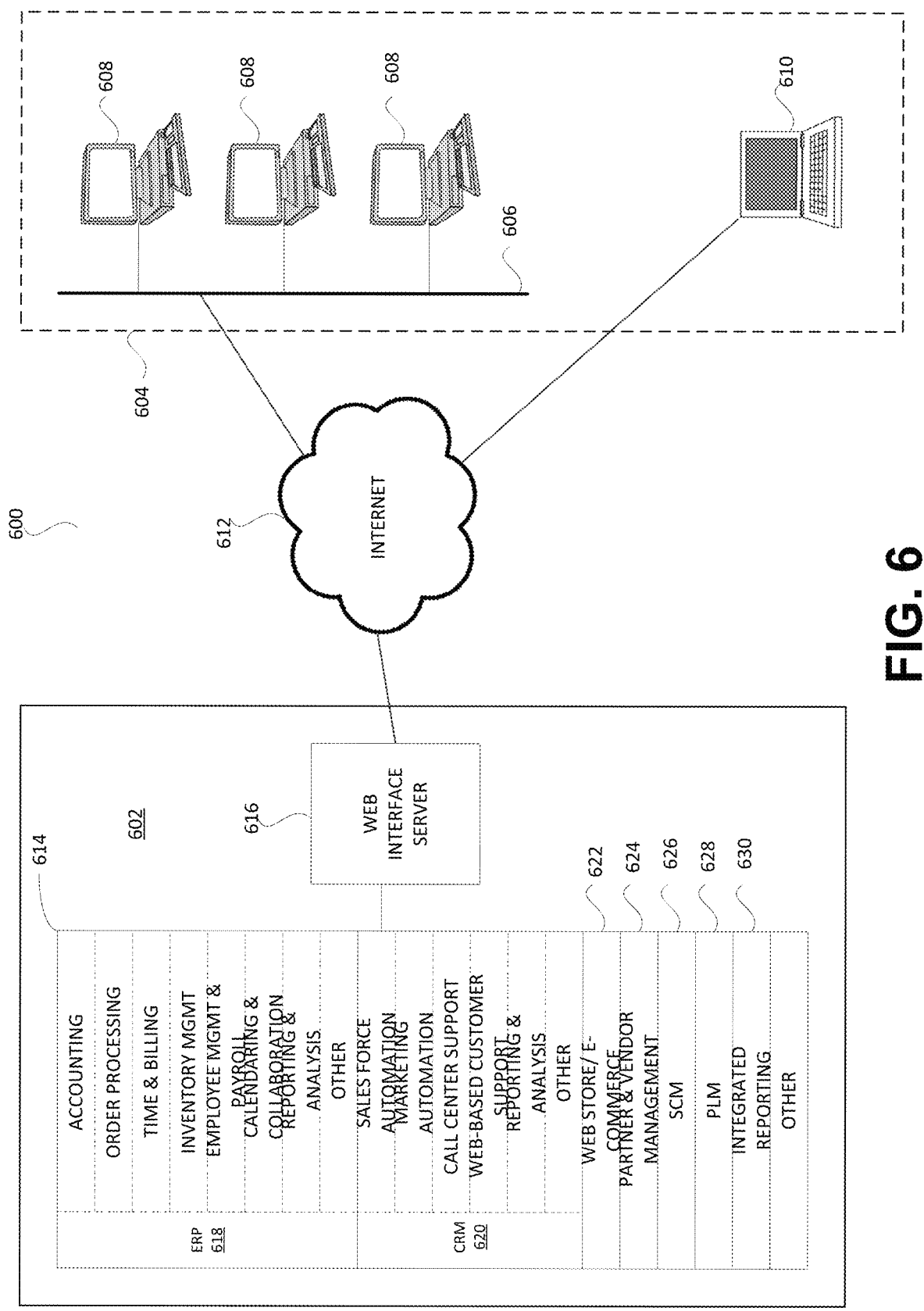
FIG. 6 illustrates an embodiment of an integrated business system and an enterprise network in which an embodiment of the invention may be implemented.

FIG. 6 is a diagram illustrating a system 600 in which an embodiment of the invention may be implemented. Enterprise network 604 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection.

For simplicity and clarity of explanation, the enterprise network 604 is represented by an on-site local area network 606 to which a plurality of personal computers 608 are connected, each generally dedicated to a particular end user, such as a service agent or other employee (although such dedication is not required), along with an exemplary remote user computer 610 that can be, for example, a laptop computer or tablet computer of a traveling employee having internet access through a public Wi-Fi access point, or other internet access method. The end users (consumers) associated with computers 608 and 610 may possess an internet-enabled smartphone or other electronic device (such as a PDA, tablet, laptop computer) having wireless internet access or other synchronization capabilities. Users of the enterprise network 604 interface with the integrated business system 602 across the Internet 612 or another suitable communications network or combination of networks.

Integrated business system 602, which may be hosted by a dedicated third party, may include an integrated business server 614 and a web interface server 616, coupled as shown in FIG. 6. It is to be appreciated that either or both of the integrated business server 614 and the web interface server 616 may be implemented on one or more different hardware systems and components, even though represented as singular units in FIG. 6.

In a typical example in which system 602 is operated by a third party for the benefit of multiple account owners/tenants, each of whom is operating a business, integrated business server 614 comprises an ERP module 618 and further comprises a CRM module 620. In many cases, it will be desirable for the ERP module 618 to share methods, libraries, databases, subroutines, variables, etc., with CRM module 620, and indeed ERP module 618 may be intertwined with CRM module 620 into an integrated Business Data Processing Platform (which may be single tenant, but is typically multi-tenant).

The ERP module 618 may include, but is not limited to, a finance and accounting module, an order processing module, a time and billing module, an inventory management and distribution module, an employee management and payroll module, a calendaring and collaboration module, a reporting and communication module, and other ERP-related modules. The CRM module 620 may include, but is not limited to, a sales force automation (SFA) module, a marketing automation module, a contact list module (not shown), a call center support module, a web-based customer support module, a reporting and communication module, and other CRM-related modules.

The integrated business server 614 (or multi-tenant data processing platform) further may provide other business functionalities including a web store/eCommerce module 622, a partner and vendor management module 624, and an integrated reporting module 630. An SCM (supply chain management) module 626 and PLM (product lifecycle management) module 628 may also be provided. Web interface server 616 is configured and adapted to interface with the integrated business server 614 to provide one or more web-based user interfaces to end users of the enterprise network 604.

The integrated business system shown in FIG. 6 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 7:
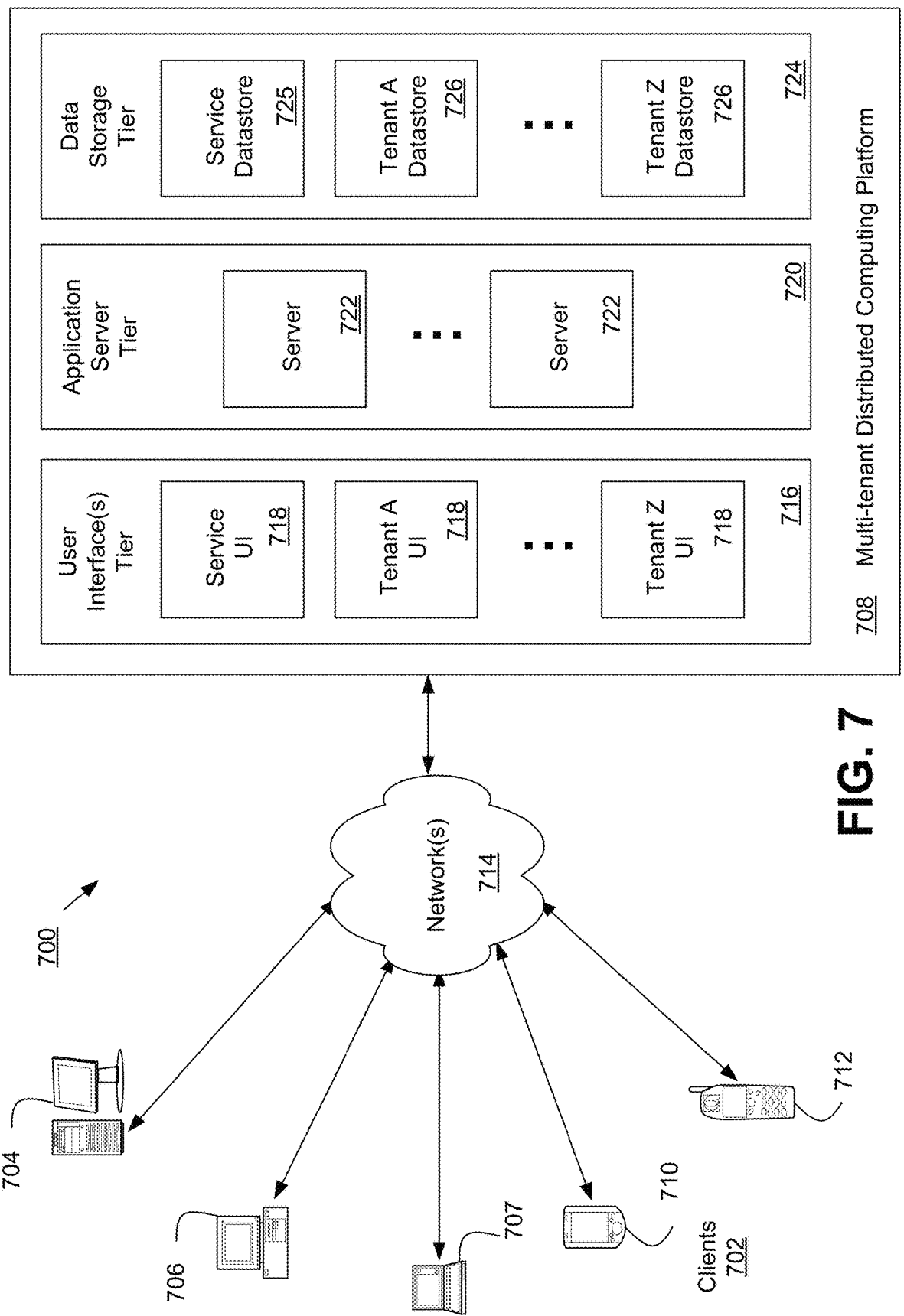
FIG. 7 illustrates an embodiment of a multi-tenant distributed computing service platform.

FIG. 7 is a diagram illustrating elements or components of an example operating environment 700 in which an embodiment of the invention may be implemented. As shown, a variety of clients 702 incorporating and/or incorporated into a variety of computing devices may communicate with a distributed computing service/platform 708 through one or more networks 714. For example, a client may incorporate and/or be incorporated into a client application (e.g., software) implemented at least in part by one or more of the computing devices.

Examples of suitable computing devices include personal computers, server computers 704, desktop computers 706, laptop computers 708, notebook computers, tablet computers or personal digital assistants (PDAs) 710, smart phones 712, cell phones, and consumer electronic devices incorporating one or more computing device components, such as one or more electronic processors, microprocessors, central processing units (CPU), or controllers. Examples of suitable networks 714 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 708 may include multiple processing tiers, including a user interface tier 716, an application server tier 720, and a data storage tier 724. The user interface tier 716 may maintain multiple user interfaces 718, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 724 may include one or more data stores, which may include a Service Data store 725 and one or more Tenant Data stores 726.

Each tenant data store 726 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 708 may be multi-tenant and service platform 708 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 722 that are part of the platform's Application Server Tier 720.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions.

In addition to ERP and CRM functions, a business information system/platform (such as element 708 of FIG. 7(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 722 that are part of the platform's Application Server Tier 720.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 708 of FIG. 7).

As noted with regards to FIG. 6, the integrated business system shown in FIG. 7 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least a processor of a computer cause the computer to:
   control, by at least the processor, a graphical user interface to display a security testing interface, wherein the security testing interface comprises a plurality of selectable inputs that define a security test, wherein the selectable inputs further define a test name, security test types, and an address of a target application upon which the security test is to be executed;
   receive, by at least the processor, a request, via the security testing interface, to perform the security test on the target application, wherein the request identifies a plurality of security scanners to be utilized and wherein each security scanner is configured to perform a different security test type of the security test such that the request further includes the test name, the security test types, and the address of the target application upon which the security test is to be executed;
   analyze, by at least the processor, the request to:
      extract, from the request, a first value identifying the address of the target application;
      determine the target application associated with a remote target device based upon the address of the target application; and
      select which of the plurality of security scanners from amongst a set of available security scanners is to be utilized to perform the security test on a target application based upon the security test type;
   access the target application on the remote target device, via a network connection, using the address of the target application identified by the first value;
   execute, by each of the selected security scanners, one of the different security test types of the security test on the target application;
   generate, by at least the processor, scan results of the target application based upon the execution of the selected security scanners; and
   control, by at least the processor, the graphical user interface to display the scan results, wherein the scan results comprise a plurality of issues such that each of the plurality of issues is identified using at least one of the selected security scanners.

2. The non-transitory computer-readable medium of claim 1, wherein the graphical user interface is a single cloud-based graphical user interface accessible by a plurality of remote devices in a centralized manner to test security of applications over at least one network connection, and wherein each of the available security scanners is configured to perform the different type of security test, associated with distinct criteria, on a same application.

3. The non-transitory computer-readable medium of claim 1, wherein the generating the scan results comprises compiling a single set of scan results for the target application, wherein the single set of scan results includes issues identified by each of the security scanners.

4. The non-transitory computer-readable medium of claim 1, further comprising instructions that when executed by at least the processor cause the computer to:
   query a false positive data structure based on a first issue in the scan results, wherein the false positive data structure comprises a list of issues previously identified as being false positives;
   in response to determining that at least one issue in the false positive data structure matches the first issue, mark the first issue as a potential false positive; and
   in response to marking the first issue as a potential false positive, control the graphical user interface to one of (i) highlight the first issue or (ii) hide the first issue.

5. The non-transitory computer-readable medium of claim 1, further comprising instructions that when executed by at least the processor cause the computer to:
   identify a set of security scripts associated with each security scanner of the selected security scanners; and
   wherein executing each of the selected security scanners comprises using the set of security scripts identified for the selected security scanner to scan the target application.

6. The non-transitory computer-readable medium of claim 1, further comprising instructions that when executed by at least the processor cause the computer to:
   compare a first issue identified using a first security scanner of the selected security scanners with a second issue identified using a second security scanner of the selected security scanners;
   in response to determining that the first issue matches the second issue, mark the first issue as a duplicate issue; and
   in response to marking the first issue as a duplicate issue, control the graphical user interface to one of (i) highlight the first issue or (ii) hide the first issue.

7. The non-transitory computer-readable medium of claim 1, further comprising instructions that when executed by at least the processor cause the computer to:
   extract, from the request, a second value identifying a first messaging address;
   extract, from the request, a third value identifying a second messaging address;
   generate a set of recipients for the scan results based upon the second value and the third value, wherein the set of recipients includes a first recipient associated with the first messaging address and a second recipient associated with the second messaging address; and
   control transmission, via a network connection, of a notification of the scan results based on the generated set of recipients, wherein each version of the notification of the scan results is further based upon whether the recipient of the notification is associated with the first messaging address or the second messaging address.

8. A computing system, comprising:
a processor connected to memory; and
a testing module stored on a non-transitory computer readable medium and configured with instructions that when executed by the processor cause the processor to:
control a single cloud-based graphical user interface to display a security testing interface, wherein the security testing interface comprises a plurality of selectable inputs that define a cloud-based multi-layered security test, wherein the selectable inputs further define a test name, security test types, and an address of a target application upon which the security test is to be executed, wherein the single cloud-based graphical user interface is accessible by a plurality of remote devices in a centralized manner to test security of applications over at least one network connection;
receive a request, via the security testing interface, to perform the cloud-based multi-layered security test on the target application, wherein the request identifies a plurality of cloud-based security scanners to be utilized, and wherein each cloud-based security scanner is configured to perform a different security test type of the security test such that the request further includes the test name, the security test types, and the address of the target application upon which the security test is to be executed;
in response to the request, (i) select which of the plurality of cloud-based security scanners from amongst a set of available cloud-based security scanners is to be utilized to perform the security test on a target application based upon the security test type and (ii) generate a single set of security test instructions to perform the cloud-based multi-layered security test on the target application using the selected cloud-based security scanners;
execute, by each of the selected cloud-based security scanners, the single set of security test instructions to initiate the different security test types of the security test on the target application;
compile a single set of scan results of the target application based upon the execution of the different security test types of the security test from the selected cloud-based security scanners; and
control the single cloud-based graphical user interface to display the single set of scan results, wherein the single set of scan results comprise information from each of the selected cloud-based security scanners.

9. The computing system of claim 8, wherein the testing module is further configured with instructions that when executed by the processor cause the processor to:
extract, from the request, a first value identifying the address of the target application;
extract, from the request, a second value identifying a login credential for the target application; and
prior to initiating the different security test types of the security test on the target application, access the target application by (i) generating an electronic communication including the second value and (ii) transmitting the electronic communication, via a network connection, using the address identified by the first value.

10. The computing system of claim 8, wherein the testing module is further configured with instructions that when executed by the processor cause the processor to:

query a false positive data structure based on a first issue in the single set of scan results, wherein the false positive data structure comprises a list of issues previously identified as being false positives;
in response to determining that at least one issue in the false positive data structure matches the first issue, mark the first issue as a potential false positive; and
in response to marking the first issue as a potential false positive, control the single cloud-based graphical user interface to one of (i) highlight the first issue or (ii) hide the first issue.

11. The computing system of claim 8, wherein the testing module is further configured with instructions that when executed by the processor cause the processor to:
identify a set of security scripts associated with each security scanner of the selected cloud-based security scanners; and
wherein initiating the different security test types of the security test on the target application comprises using the set of security scripts identified for each of the selected cloud-based security scanners to scan the target application.

12. The computing system of claim 8, wherein the testing module is further configured with instructions that when executed by the processor cause the processor to:
compare a first issue identified using a first cloud-based security scanner of the selected cloud-based security scanners with a second issue identified using a second cloud-based security scanner of the selected cloud-based security scanners;
in response to determining that the first issue matches the second issue, mark the first issue as a duplicate issue; and
in response to marking the first issue as a duplicate issue, control the single cloud-based graphical user interface to one of (i) highlight the first issue or (ii) hide the first issue.

13. The computing system of claim 8, wherein the testing module is further configured with instructions that when executed by the processor cause the processor to:
extract, from the request, a second value identifying a first messaging address;
extract, from the request, a third value identifying a second messaging address;
generate a set of recipients for the single set of scan results based upon the second value and the third value, wherein the set of recipients includes a first recipient associated with the first messaging address and a second recipient associated with the second messaging address; and
control transmission, via a network connection, of a notification of the single set of scan results based on the generated set of recipients, wherein each version of the notification of the scan results is further based upon whether the recipient of the notification is associated with the first messaging address or the second messaging address.

14. The computing system of claim 8, wherein the testing module is further configured with instructions that when executed by the processor cause the processor to:
identify a set of vulnerabilities of the target application using each of the selected cloud-based security scanners; and
combine the sets of vulnerabilities to generate the scan results.

15. A computer-implemented method performed by a computing device comprising a processor, the computer-implemented method comprising:

controlling, by at least the processor, a single cloud-based graphical user interface to display a security testing interface, wherein the security testing interface comprises a plurality of selectable inputs that define a cloud-based multi-layered security test, wherein the selectable inputs further define a test name, security test types, and an address of a target application upon which the security test is to be executed, wherein the single cloud-based graphical user interface is accessible by a plurality of remote devices in a centralized manner to test security of applications over at least one network connection;

receiving, by at least the processor, a request, via the security testing interface, to perform the cloud-based multi-layered security test on the target application, wherein the request identifies a plurality of cloud-based security scanners to be utilized, and wherein each cloud-based security scanner is configured to perform a different security test type of the security test such that the request further includes the test name, the security test types, and the address of the target application upon which the security test is to be executed;

in response to the request, (i) selecting, by at least the processor, which of the plurality of cloud-based security scanners from amongst a set of available cloud-based security scanners is to be utilized to perform the security test on a target application based upon the security test type and (ii) generating, by at least the processor, a single set of security test instructions to perform the cloud-based multi-layered security test on the target application using the selected cloud-based security scanners;

executing, by each of the selected security scanners, the single set of security test instructions to initiate the different security test types of the security test on the target application;

compiling, by at least the processor, a single set of scan results of the target application based upon the execution of the different security test types of the security test from the selected cloud-based security scanners; and controlling, by at least the processor, the single cloud-based graphical user interface to display the single set of scan results, wherein the single set of scan results comprise information from each of the selected cloud-based security scanners.

16. The computer-implemented method of claim 15, further comprising:

extracting, from the request, a first value identifying the address of the target application;

extracting, from the request, a second value identifying a login credential for the target application; and prior to initiating the different security test types of the security test on the target application, accessing the target application by (i) generating an electronic communication including the second value and (ii) transmitting the electronic communication, via a network connection, using the address identified by the first value.

17. The computer-implemented method of claim 15, further comprising:

querying a false positive data structure based on a first issue in the single set of scan results, wherein the false positive data structure comprises a list of issues previously identified as being false positives;

in response to determining that at least one issue in the false positive data structure matches the first issue, marking the first issue as a potential false positive; and in response to marking the first issue as a potential false positive, controlling the single cloud-based graphical user interface to one of (i) highlight the first issue or (ii) hide the first issue.

18. The computer-implemented method of claim 15, further comprising:

identifying a set of security scripts associated with each security scanner of the selected cloud-based security scanners; and wherein initiating the different security test types of the security test on the target application comprises using the set of security scripts identified for each of the selected cloud-based security scanners to scan the target application.

19. The computer-implemented method of claim 15, further comprising:

comparing a first issue identified using a first cloud-based security scanner of the selected cloud-based security scanners with a second issue identified using a second cloud-based security scanner of the selected cloud-based security scanners;

in response to determining that the first issue matches the second issue, marking the first issue as a duplicate issue; and in response to marking the first issue as a duplicate issue, controlling the single cloud-based graphical user interface to one of (i) highlight the first issue or (ii) hide the first issue.

20. The computer-implemented method of claim 15, further comprising:

extracting, from the request, a second value identifying a first messaging address;

extracting, from the request, a third value identifying a second messaging address;

generating a set of recipients for the single set of scan results based upon the second value and the third value, wherein the set of recipients includes a first recipient associated with the first messaging address and a second recipient associated with the second messaging address; and controlling transmission, via a network connection, of a notification of the single set of scan results based on the generated set of recipients, wherein each version of the notification of the scan results is further based upon whether the recipient of the notification is associated with the first messaging address or the second messaging address.

* * * * *